United States Patent
Sun et al.

(10) Patent No.: US 8,036,644 B2
(45) Date of Patent: Oct. 11, 2011

(54) METHOD FOR JOIN BACKGROUND SOUND TO MOBILE COMMUNICATION TALKING

(75) Inventors: Nan Sun, Beijing (CN); Zhaohui Zhen, Beijing (CN); Rongrong Yu, Beijing (CN); Lingjun Feng, Beijing (CN)

(73) Assignee: China Mobile Communications Corporation, Beijing (CN)

(*) Notice: Subject to any disclaimer, the term of this patent is extended or adjusted under 35 U.S.C. 154(b) by 583 days.

(21) Appl. No.: 11/666,545

(22) PCT Filed: Sep. 29, 2005

(86) PCT No.: PCT/CN2005/001603
§ 371 (c)(1),
(2), (4) Date: Dec. 3, 2008

(87) PCT Pub. No.: WO2006/045236
PCT Pub. Date: May 4, 2006

(65) Prior Publication Data
US 2009/0233581 A1    Sep. 17, 2009

(30) Foreign Application Priority Data
Oct. 29, 2004    (CN) .......................... 2004 1 0088446

(51) Int. Cl.
*H04M 3/42*    (2006.01)
(52) U.S. Cl. .................................................. 455/414.1
(58) Field of Classification Search .................. None
See application file for complete search history.

(56) References Cited

U.S. PATENT DOCUMENTS

| | | | | |
|---|---|---|---|---|
| 5,448,625 A | * | 9/1995 | Lederman | 379/88.25 |
| 6,178,231 B1 | * | 1/2001 | Nabkel | 379/88.19 |
| 6,859,779 B2 | * | 2/2005 | Yokoyama | 704/278 |
| 7,424,098 B2 | * | 9/2008 | Kovales et al. | 379/76 |
| 2002/0103647 A1 | * | 8/2002 | Houplain | 704/260 |
| 2003/0195009 A1 | * | 10/2003 | Endo | 455/466 |
| 2005/0059434 A1 | * | 3/2005 | Hong | 455/567 |

* cited by examiner

*Primary Examiner* — Ajit Patel
(74) *Attorney, Agent, or Firm* — Vidas, Arrett & Steinkraus P.A.

(57) ABSTRACT

The present invention relates to a method for adding background sound to mobile communication talking. In the method of the present invention, a subscriber may dial additionally a background sound service number at the time of calling the a called party to make a mobile communication exchange, on the basis of the additionally-dialed number, add a talking link of a third party provided by the background sound system to establish a three-party talking at the time of establishing a talking link between a calling mobile communication terminal and a called mobile communication terminal. Thus, the calling and called parties can have a background sound service during the talking. According to the present invention, the calling subscribers are enabled to readily add background sound to relevant talking with the called parties through additionally dialing background sound service numbers and therefore, new telecommunications valued-added services may be added in existing mobile communication networks, making the talking between the calling and called parties more interesting and humanized.

10 Claims, 3 Drawing Sheets

METHOD FOR JOIN BACKGROUND SOUND TO MOBILE COMMUNICATION TALKING

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The present invention relates to a method for adding background sound to mobile communication talking. In particular, the present invention relates to a method for changing voice effect of telephone by playing background sound from the non-talking parties during mobile communication voice talking, in order to make the talking more interesting. The present invention pertains to the field of communication technology.

BRIEF DESCRIPTION OF RELATED ART

With the development of the system and market of communication technology, demands of people for communication have become more and more diversified. Therefore, as for these diversified demands, various communication technologies have been developed and relevant communication services have been produced and introduced to meet multi-level and multicolored requirements of people for communication. In the field of conventional voice talking, some communication enterprises have already provided sound-effect-based technologies and corresponding services. For example, one of such services is the coloring ring back tone service, which makes a calling party receiving the service hear the sound effect ordered by the called party after the calling is connected and before the talking, and changes the conventional monotonous ring back tone into colorful and individualized sound effect, adding new taste in the talking.

Although more and more technologies for voice talking are introduced continuously, communication technologies which can change the sound effect in the actual talking have not been greatly improved. The existing voice talking technology is directed more to how to reduce the noise interference during the talking and how to improve the quality of talking voice signal. However, it never relates to changing sound effect during the talking. Actually, people have various demands and hope to play during the talking the sound generated by the non-talking parties, i.e. a background sound.

Background sounds are those other sounds added to the sounds of respective parties of a talking. These sounds may be set depending on the people's demands, such as sounds of pets, funny popular words, feeling expressing voices, sounds of water of the nature and atmosphere effect sounds, etc. Playing these sounds generated by the non-talking parties may change the monotonous talking mode in which pure voice is listened, and add sounds enlivening the atmosphere. This will make routine telephone talking more interesting.

In prior art, at the time of calling a called party, some special service numbers may be dialed to enjoy other services provided by the communication operator. For example, a lower pricing benchmark may be obtained if the IP phone number is dialed before dialing the number of the called party. However, no technical solution is introduced to provide background sound service through the dialing of special service numbers until now.

DETAILED DESCRIPTION OF THE INVENTION

This section is for the purpose of summarizing some aspects of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

A primary aspect of the present invention is to provide a method for adding background sound to mobile communication talking to overcome the defects in prior art. In the method of the present invention, a subscriber may dial additionally a background sound service number at the time of calling the a called party to make a mobile communication exchange, on the basis of the additionally-dialed number, add a talking link of a third party provided by the background sound system to establish a three-party talking at the time of establishing a talking link between a calling mobile communication terminal and a called mobile communication terminal. Meanwhile, the sound effect of the background sound may be controlled by the calling party or the contracted party through its mobile communication terminal, making the conventional mobile telephone talking be more interesting and humanized due to the background sound added.

Other aspects, features, and advantages of the present invention will become apparent upon examining the following detailed description of an embodiment thereof, taken in conjunction with the attached drawings.

The aspect of the present invention is achieved as follows:

When a talking call is made by a calling mobile communication terminal to a called mobile communication terminal through a mobile communication base station and a mobile switching center of a calling party, the number dialed by the calling mobile communication terminal is analyzed firstly, and if the number dialed contains a background sound service number, the background sound service number is separated from the number of the called mobile communication terminal; The mobile switching center of the calling party, based upon the number of the called mobile communication terminal, sends a calling signal to a mobile switching center of the called party through the mobile communication network and stores temporarily the background sound service number;

Upon receiving the calling signal, the mobile switching center of the called party judges the talking state of the called mobile communication terminal, and if the called mobile communication terminal is in an idle state, the mobile switching center of the called party sends a ringing signal to the called mobile communication terminal through a mobile communication base station and sends a ring back signal to the mobile switching center of the calling party through a mobile communication network; Otherwise, the mobile switching center of the called party sends an information that the called mobile communication terminal is in a non-idle state to the mobile switching center of the calling party;

Upon receiving the ring back signal sent by the mobile switching center of the called party, the mobile switching center of the calling party transfers the ring back signal to the calling mobile communication terminal through a mobile communication station; If the background sound service number has already been stored, the mobile switching center of the calling party, upon receiving the off-hook signal of the called mobile communication terminal, establishes a three-party talking between the calling mobile communication terminal, the called mobile communication terminal and the background sound service system and sends the background sound service number to the background sound service system; The background sound service system plays corresponding background sound to the calling mobile communication terminal and the called mobile communication terminal through the mobile switching center of the calling party;

If no background sound service number is stored, while the calling mobile communication terminal is a contracted subscriber of the background sound service, the mobile switching center of the calling party, upon receiving the off-hook signal of the called mobile communication terminal, establishes a three-party talking between the calling mobile communication terminal, the called mobile communication terminal and the background sound service system and sends the information on the number of the calling mobile communication terminal to the background sound service system; The background sound service system plays the background sound ordered by the calling mobile communication terminal to the calling mobile communication terminal and the called mobile communication terminal through the mobile switching center of the calling party;

If no background sound service number is stored, and at the same time the calling mobile communication terminal is not a contracted subscriber of the background sound service, the mobile switching center of the calling party, upon receiving the off-hook signal of the called mobile communication terminal, establishes a two-party talking between the calling mobile communication terminal and the called mobile communication terminal;

If the information that the called mobile communication terminal is in a non-idle state sent by the mobile switching center of the called party is received, the mobile switching center of the calling party, based upon relevant information, sends corresponding feedback signal to the calling mobile communication terminal through a mobile communication station and terminates the call;

Upon on-hook of either of the calling mobile communication terminal or the called mobile communication terminal, the mobile switching center of the calling party and the mobile switching center of the called party release a corresponding talking link; If a three-party talking is made between the calling mobile communication terminal, the called mobile communication terminal and the background sound service system by the mobile exchange of the calling party, the mobile switching center of the calling party releases simultaneously a corresponding talking link with the background sound service system; The background sound service system ceases playing the background sound ordered by the calling mobile communication terminal to the calling mobile communication terminal and the called mobile communication terminal.

When the mobile switching center of the called party sends a ringing signal to the called mobile communication terminal through a mobile communication base station, if the called mobile communication terminal is a contracted subscriber of the background sound service, the mobile switching center of the called party, upon receiving the off-hook signal of the called mobile communication terminal, establishes a three-party talking between the calling mobile communication terminal, the called mobile communication terminal and the background sound service system and sends information on the number of the called mobile communication terminal to the background sound service system; The background sound service system plays the background sound ordered by the called mobile communication terminal to the calling mobile communication terminal and the called mobile communication terminal through the mobile switching center of the called party;

Upon on-hook of either of the calling mobile communication terminal or the called mobile communication terminal, if a three-party talking is made between the calling mobile communication terminal, the called mobile communication terminal and the background sound service system by the mobile exchange of the called party, the mobile switching center of the called party releases simultaneously a corresponding talking link with the background sound service system; The background sound service system ceases playing the background sound ordered by the called mobile communication terminal to the calling mobile communication terminal and the called mobile communication terminal.

It should be noted that in the technical solution above, the calling mobile communication terminal and the called mobile communication terminal may be or may not be a contracted subscriber of the background sound service; one may be a contracted subscriber of the background sound service while the other not; and both of them may be contracted subscribers of the background sound service. Thus, in the technical solution of the present invention, the background sound service system offers background sound playing services according to the dialing or contracting information. In other words, even though the background sound service system has played background sound to the calling mobile communication terminal and the called mobile communication terminal according to the contracting state of the calling mobile communication terminal, it shall simultaneously play background sound to the calling mobile communication terminal and the called mobile communication terminal according to the contracting state of the called mobile communication terminal, so long as the called mobile communication terminal is also a contracted subscriber. If both of the calling mobile communication terminal and the called mobile communication terminal are contracted, when the calling mobile communication terminal and the called mobile communication terminal are engaged, two background sounds of the background sound service system can be heard in both the calling mobile communication terminal and the called mobile communication terminal.

In summary, the present invention provides a method for adding background sound during the talking in a mobile communication network, wherein the calling subscribers are enabled to readily add background sound to relevant talking with the called parties through additionally dialing background sound service numbers and therefore, new telecommunications valued-added services may be added in existing mobile communication networks, making the talking between the calling and called parties more interesting and humanized.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

The present invention will be described in detail with reference to the figures and embodiments. The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Embodiment 1

Figure 1:
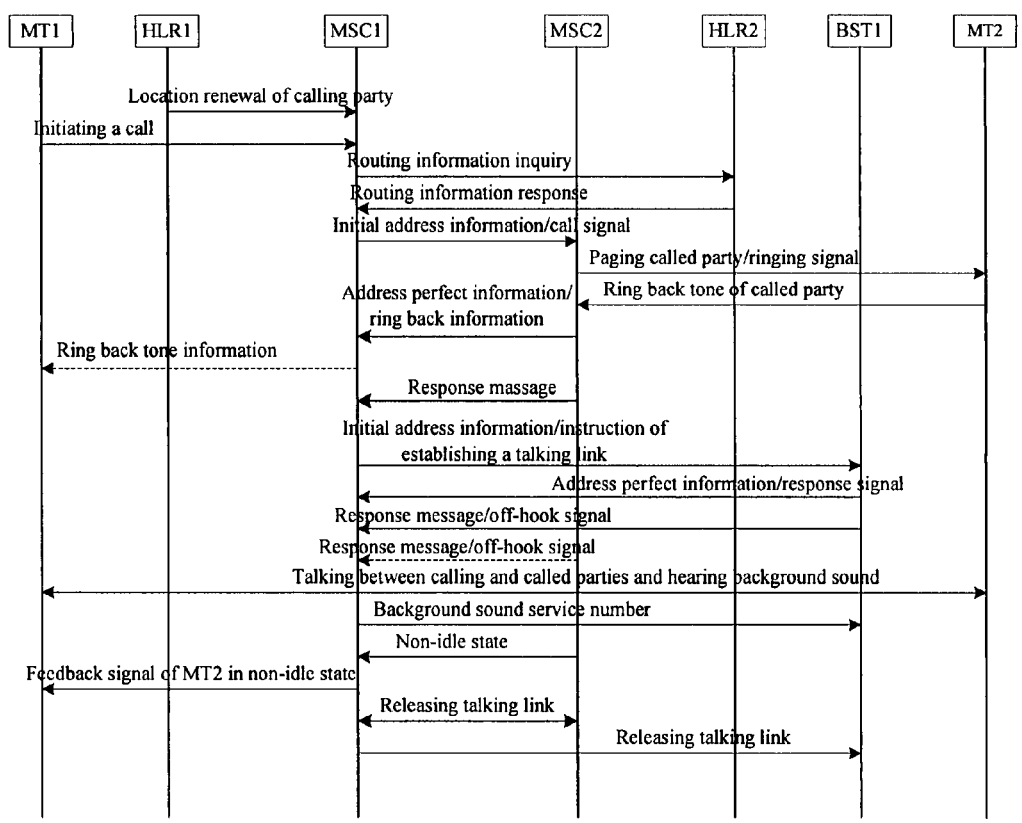
FIG. 1 is the processing flowchart of the first embodiment of the present invention.

Referring to FIG. 1, in the first embodiment of the present invention, the detailed flowchart is as follows:

A calling mobile communication terminal MT1 makes a call to a called mobile communication terminal MT2 through a mobile communication station BS1 and a mobile switching center MSC1 of the calling party. The number, for instance, "1238613901234567", dialed by the calling mobile communication terminal MT1, is analyzed firstly by the mobile switching center MSC1 of the calling party. If the number contains a background sound service number, for instance, "12386", the background sound service number is separated from the number of the called mobile communication terminal MT2, for instance, "13901234567". The mobile switching center MSC1 of the calling party, based upon "13901234567" which is the number of the called mobile communication terminal MT2, sends the calling signal to the mobile switching center MSC2 of the called party through mobile communication network and stores temporarily the background sound service number "12386";

Upon receiving the calling signal, the mobile switching center MSC2 of the called party judges the talking state of the called mobile communication terminal MT2. If the called mobile communication terminal MT2 is in an idle state, the mobile switching center MSC2 of the called party sends a ringing signal to the called mobile communication terminal MT2 through a mobile communication base station BS2 and sends a ring back signal to the mobile switching center MSC1 of the calling party through the mobile communication network. Otherwise, the mobile switching center MSC2 of the called party sends to the mobile switching center MSC1 of the calling party the information that the called mobile communication terminal MT2 is in a non-idle state.

Upon receiving the ring back signal sent by the mobile switching center MSC2 of the called party, the mobile switching center MSC1 of the calling party transfers the ring back signal to the calling mobile communication terminal MT1 through the mobile communication station BS1. If the background sound service number has already been stored, the mobile switching center MSC1 of the calling party, upon receiving the off-hook signal of the called mobile communication terminal MT2, establishes a three-party talking between the calling mobile communication terminal MT1, the called mobile communication terminal MT2 and the background sound service system BST1 and sends the background sound service number "12386" to the background sound service system BST1. The background sound service system BST1 plays corresponding background sound to the calling mobile communication terminal MT1 and the called mobile communication terminal MT2 through the mobile switching center MSC1 of the calling party;

If no background sound service number is stored in the mobile switching center MSC1 of the calling party, it means that the call made by the calling mobile communication terminal MT1 is an ordinary one. However, as the calling mobile communication terminal MT1 is a contracted subscriber of the background sound service, the mobile switching center MSC1 of the calling party, upon receiving the off-hook signal of the called mobile communication terminal MT2, establishes a three-party talking between the calling mobile communication terminal MT1, the called mobile communication terminal MT2 and the background sound service system BST1 and sends the information on the number of the calling mobile communication terminal MT1 to the background sound service system BST1. The background sound service system BST1 plays the background sound ordered by the calling mobile communication terminal MT1 to the calling mobile communication terminal MT1 and the called mobile communication terminal MT1 through the mobile switching center MSC1 of the calling party;

If no background sound service number is stored in the mobile switching center MSC1 of the calling party, it means that the call made by the calling mobile communication terminal MT1 is an ordinary one. Meanwhile, if the calling mobile communication terminal MT1 is not a contracted subscriber of the background sound service, the mobile switching center MSC1 of the calling party, upon receiving the off-hook signal of the called mobile communication terminal MSC2, establishes a two-party talking between the calling mobile communication terminal MT1 and the called mobile communication terminal MT2;

If the information that the called mobile communication terminal MT2 is in a non-idle state which is sent by the mobile switching center MSC2 of the called party is received, the mobile switching center MSC1 of the calling party, based upon relevant information, sends corresponding feedback signal to the calling mobile communication terminal MSC1 through the mobile communication base station BS1 (not shown) and terminates the call;

Upon on-hook of either of the calling mobile communication terminal MT1 or the called mobile communication terminal MT1, the mobile switching center MSC1 of the calling party and the mobile switching center MSC2 of the called party release a corresponding talking link. If a three-party talking is made between the calling mobile communication terminal MT1, the called mobile communication terminal MT2 and the background sound service system BST1 by the mobile exchange MSC1 of the calling party, the mobile switching center MSC1 of the calling party releases simultaneously a corresponding talking link with the background sound service system BST1. The background sound service system BST1 ceases playing the background sound ordered by the calling mobile communication terminal MT1 to the calling mobile communication terminal MT1 and the called mobile communication terminal MT2.

In the embodiment above, when the mobile switching center MSC1 of the calling party judges whether the calling mobile communication terminal MT1 is a contracted subscriber, the mobile switching center MSC1 of the calling party makes access to the home location register HLR1 of the calling mobile communication terminal MT1 to obtain the information on the contracting of background sound service of the calling mobile communication terminal MT1. Actually, the information on the contracting of background sound service of the calling mobile communication terminal MT1 is stored in the home location register HLR1 of the calling mobile communication terminal MT1. When the mobile switching center MSC1 of the calling party makes access to the home location register HLR1, it reads out a series of service sign information including the sign information on the background sound service, from which the mobile switching center MSC1 of the calling party seeks out the sign indicating the contracting state of the background sound service, and makes judgment to acquire whether the calling mobile communication terminal MT1 is contracted.

When the calling mobile communication terminal MT1 is a contracted subscriber of the background sound service, the mobile switching center MSC1 of the calling party establishes the three-party talking through the procedures as follows:

The mobile switching center MSC1 of the calling party sends to the background sound service system BST1 instructions to establish a talking link at the time of establishing a talking link between the calling mobile communication terminal MT1 and the called mobile communication terminal MT2. The instruction is actually a call signaling sent to the switching device in the background sound service system. When the background sound service system BST1 receives the call signaling sent by the mobile switching center MSC1 of the calling party, as long as there is an idle channel in the switching device, the switching device will make response to the call signaling, and send off-hook signal to the mobile switching center MSC1 of the calling party after the response is made. Upon receiving the response signal and the off-hook signal, the mobile switching center MSC1 of the calling party adds the background sound service channel provided by the background sound service system BST1 to the talking link between the calling mobile communication terminal MT1 and the called mobile communication terminal MT2, to establish a three-party talking.

When the background sound service system BST1 plays the background sound as the result of the dialing of the calling mobile communication terminal MT1, the playing procedures comprises: the background sound service system BST1 extracts parameters from the background sound service number "12386" sent from the mobile switching center MSC1 of the calling party and dialed by the calling mobile communication terminal MT1 and acquires the playing parameters and playing contents from such parameters. In the first embodiment, the background sound service number consists of three parts, wherein "123" represents the special service identification code of the background sound, "8" for the serial number of the background sound to be dialed and "6" for the control speed of the background sound to be dialed. Then, the playing contents and corresponding playing parameters are packaged in a format of mobile communication data, which are then sent to the calling mobile communication terminal MT1 and the called mobile communication terminal MT2 through the mobile switching center MSC1 of the calling party.

When the calling mobile communication terminal MT1 initiates the playing of background sound by means of contracting, the background sound service system BST1, based upon the number information of the calling mobile communication terminal MT1, for example, "13901234567", seeks out the contracting information on the calling mobile communication terminal MT1 in the background sound service system BST1 and acquires the playing parameters and playing contents from such information. Then it packages the playing contents and corresponding playing parameters in a format of mobile communication data and sends them to the calling mobile communication terminal MT1 and the called mobile communication terminal MT2 through the mobile switching center MSC1 of the calling party. The calling mobile communication terminal MT1 and the called mobile communication terminal MT2, according to relevant protocols of mobile communication, processes respectively the received playing data, restores the data to corresponding audio signals and plays the signals together with corresponding voices.

In order to control the background sound played during the talking, the calling subscriber may press corresponding control buttons on the calling mobile communication terminal MT1. The values of such buttons are transferred by the calling mobile communication terminal MT1 to the background sound service system BST through the mobile communication base station BS1 and the mobile switching center MSC1 of the calling party. The control device in the background sound service system BST1 calls the functions corresponding to these values upon receiving relevant values of the buttons, to achieve the control of the playing of the background sound.

For example, if the value of the button "*" corresponds to the function of pausing the playing of the background sound, the control device in the background sound service system BST1, upon receiving value of the button "*" from the calling mobile communication terminal MT1, gives instructions to pause the playing for a period of time, for example, 5 seconds, to the playing device in the background sound service system BST1. Then the playing device in the background sound service system BST1 pauses the playing of the background sound for that period of time.

For another example, if the value of the button "#" corresponds to the function of faster playing of the background sound, the control device in the background sound service system BST1, upon receiving value of the button "#" from the calling mobile communication terminal MT1, gives instructions to faster play the background sound, to the playing device in the background sound service system BST1. Then the playing device in the background sound service system BST1 increases the speed of playing the background to the set speed.

For a further example, if the value of a button corresponds to a certain level of volume of the background sound, the control device in the background sound service system BST, upon receiving value of the button from the calling mobile communication terminal MT1, gives instructions to adjust the volume corresponding to the button, to the playing device in the background sound service system BST1. Then the playing device in the background sound service system BST1 plays the background sound at that level of volume, when the corresponding data package is received by the calling mobile communication terminal MT1 and the called mobile communication terminal MT2.

All the control and adjustment above are based upon the operations of the buttons and their corresponding functions, and may be but not be limited to the contents as described above. They may also be the background sound to be selected to play, adjusting the effect of the playing of the background sound, or controlling the start or stop of the playing of the background sound, etc.

Embodiment 2

Figure 2:
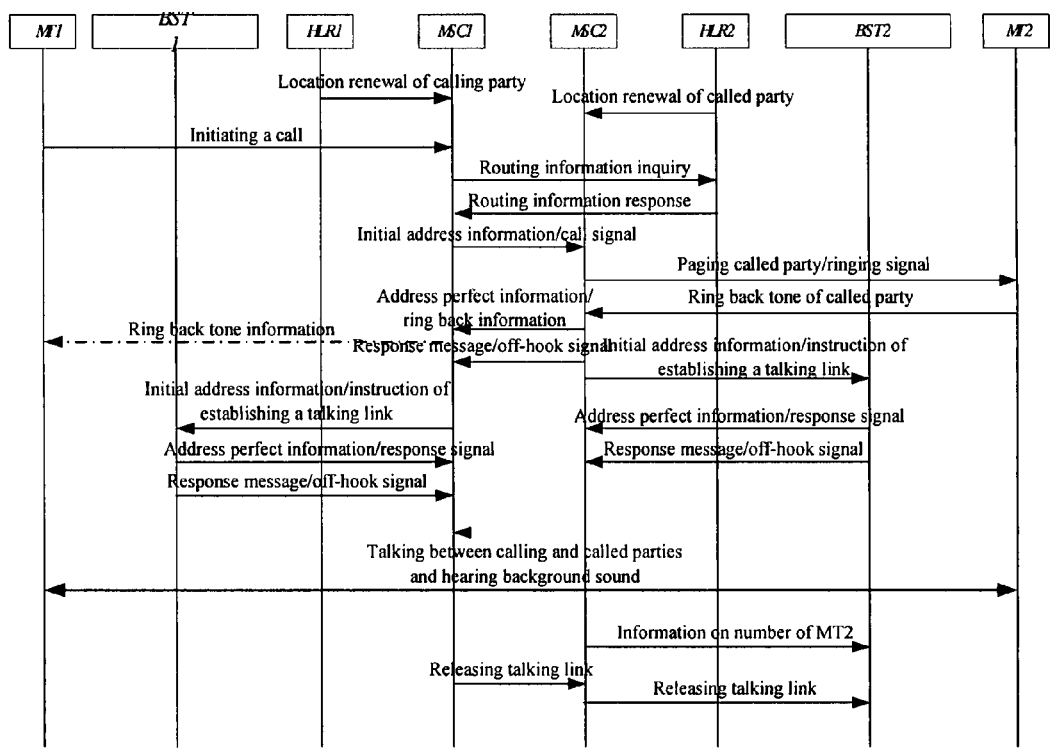
FIG. 2 is the processing flowchart of the second and third embodiments of the present invention.

Referring to FIG. 2, in the second embodiment of the present invention, the calling mobile communication terminal MT1 is a contracted subscriber of background sound service and the called mobile communication terminal MT2 is also a contracted subscriber of background sound service. The contracting information of the calling mobile communication terminal MT1 is stored in the home location register HLR1 of the calling mobile communication terminal MT1 and the contracting information of the called mobile communication terminal MT2 is stored in the home location register HLR2 of the called mobile communication terminal MT2. The corresponding contracting information may be acquired by the mobile switching center MSC1 of the calling party through making access to the home location register HLR1 of the calling mobile communication terminal MT1 and by the mobile switching center MSC2 of the called party through making access to the home location register HLR2 of the called mobile communication terminal MT2. The background sound service may be offered through the background sound service system BST2 connected to the mobile communication network at the time of establishing a talking link with the called mobile communication terminal MT2. Following is the detailed flowchart:

The calling mobile communication terminal MT1 makes a call to the called mobile communication terminal MT2 through the mobile switching center MSC1 of the calling party, establishes a three-party talking with the background sound service system BST1, and controls the playing of the background sound through the buttons. All the above steps are similar to those described in embodiment 1. What is different in embodiment 2 from embodiment 1 is that if the called mobile communication terminal MT2 is a contracted subscriber of background sound service, following procedures shall be carried out besides those as mentioned above:

When the mobile switching center MSC2 of the called party sends a ringing signal to the called mobile communication terminal MT2 through the mobile communication base station BS2, if the called mobile communication terminal MT2 is a contracted subscriber of the background sound service, the mobile switching center MSC2 of the called party, upon receiving the off-hook signal of the called mobile communication terminal MT2, establishes a three-party talking between the calling mobile communication terminal MT1, the called mobile communication terminal MT2 and the background sound service system BST2 and sends the information on the number of the called mobile communication terminal MT2 to the background sound service system BST2, for example, "13901234567". The background sound service system BST2 plays the background sound ordered by the called mobile communication terminal MT2 to the calling mobile communication terminal MT1 and the called mobile communication terminal MT2 through the mobile switching center MSC2 of the called party;

Upon on-hook of either of the calling mobile communication terminal MT1 or the called mobile communication terminal MT2, if a three-party talking is made between the calling mobile communication terminal MT1, the called mobile communication terminal MT2 and the background sound service system BST2 by the mobile exchange MSC2 of the called party, the mobile switching center MSC2 of the called party releases simultaneously a corresponding talking link with the background sound service system BST2. The background sound service system BST2 ceases playing the background sound ordered by the called mobile communication terminal MT2 to the calling mobile communication terminal MT1 and the called mobile communication terminal MT2.

In the embodiment above, when the mobile switching center MSC2 of the called party judges whether the called mobile communication terminal MT2 is a contracted subscriber, the mobile switching center MSC2 of the called party makes access to the home location register HLR2 of the called mobile communication terminal MT2 to obtain the information on the contracting of background sound service of the called mobile communication terminal MT2. Actually, the information on the contracting of background sound service of the called mobile communication terminal MT2 is stored in the home location register HLR2 of the called mobile communication terminal MT2. When the mobile switching center MSC2 of the called party makes access to the home location register HLR2, it reads out a series of service sign information including the sign information on the background sound service, from which the mobile switching center MSC2 of the called party seeks out the sign indicating the contracting state of the background sound service and makes judgment, to acquire whether the called mobile communication terminal MT2 is contracted.

When the called mobile communication terminal MT2 is a contracted subscriber of the background sound service, the mobile switching center MSC2 of the called party establishes the three-party talking through the procedure as follows:

The mobile switching center MSC2 sends the background sound service system BST2 instructions to establish a talking link at the time of establishing a talking link between the calling mobile communication terminal MT1 and the called mobile communication terminal MT2. The instruction is actually a call signaling sent to the switching device in the background sound service system BST2. When the background sound service system BST2 receives the call signaling sent by the mobile switching center MSC2 of the called party, as long as there are idle channels in the switching device, the switching device will make response to the call signaling, and send off-hook signal to the mobile switching center MSC2 of the called party after the response is made. Upon receiving the response signal and the off-hook signal, the mobile switching center MSC2 of the called party adds the background sound service channel provided by the background sound service system BST2 to the talking link between the calling mobile communication terminal MT1 and the called mobile communication terminal MT2, to establish a three-party talking.

During the playing of background sound ordered by the called mobile communication terminal MT2 by the background sound service system BST2, the background sound service system BST2, based upon the number information of the called mobile communication terminal MT2, for example, "13901234567", seeks out the contracting information on the called mobile communication terminal MT2 in the background sound service system BST2 and acquires the playing parameters and playing contents from such information. Then it packages the playing contents and corresponding playing parameters in a format of mobile communication data and sends them to the calling mobile communication terminal MT1 and the called mobile communication terminal MT2 through the mobile switching center MSC2 of the called party. The calling mobile communication terminal MT1 and the called mobile communication terminal MT2 processes respectively the received playing data according to relevant protocols of mobile communication, restores the data to corresponding audio signals and plays the signals together with corresponding voices.

In order to control the background sound played during the talking, the called subscriber may press corresponding control buttons on the called mobile communication terminal MT2, and the values of such buttons are transferred by the called mobile communication terminal MT2 to the background sound service system BST2 through the mobile communication base station BS2 and the mobile switching center MSC2 of the called party. The control device in the background sound service system BST2 calls the functions corresponding to these values upon receiving relevant values of the buttons, to achieve the control of the playing of the background sound.

The manner in which the called mobile communication terminal MT2 plays the background sound through control of the background sound service system BST2 by the buttons is substantially the same as that in embodiment 1 and is not described further.

It can be seen from the embodiment 2 above that, when the calling mobile communication terminal MT1 initiates the playing of background sound through dialing or the calling mobile communication terminal MT1 is a contracted subscriber of background sound service and the called mobile communication terminal MT2 is also a contracted subscriber of background sound service, if a talking link is made between the calling mobile communication terminal MT1 and the called mobile communication terminal MT2, both of the calling and called parties can hear the background sound ordered by both the parties, and the calling and called parties can control or adjust the playing effect of respective background sound.

Embodiment 3

Referring to FIG. 2 again, if the calling mobile communication terminal MT1 is not a contracted subscriber of background sound service and does not dial the number of background sound service, the mobile switching center MSC1 of the calling party, upon receiving the on-hook signal of the called mobile communication terminal MT2, only establishes a two-party talking link between the calling mobile communication terminal MT1 and the called mobile communication terminal MT2. If the called mobile communication terminal MT2 is also not a contracted subscriber of background sound service, the said talking link is an ordinary voice talking link. But, if the called mobile communication terminal MT2 is a contracted subscriber of background sound service, according to the method described in embodiment 2 above, the mobile switching center MSC2 of the called party will establish a three-party talking between the calling mobile communication terminal MT1, the called mobile communication terminal MT2 and the background sound service system BST2. The background sound service system BST2 plays background sound to the calling mobile communication terminal MT1 and the called mobile communication terminal MT2 simultaneously and is controlled only by the called mobile communication terminal MT2.

Embodiment 4

Figure 3:
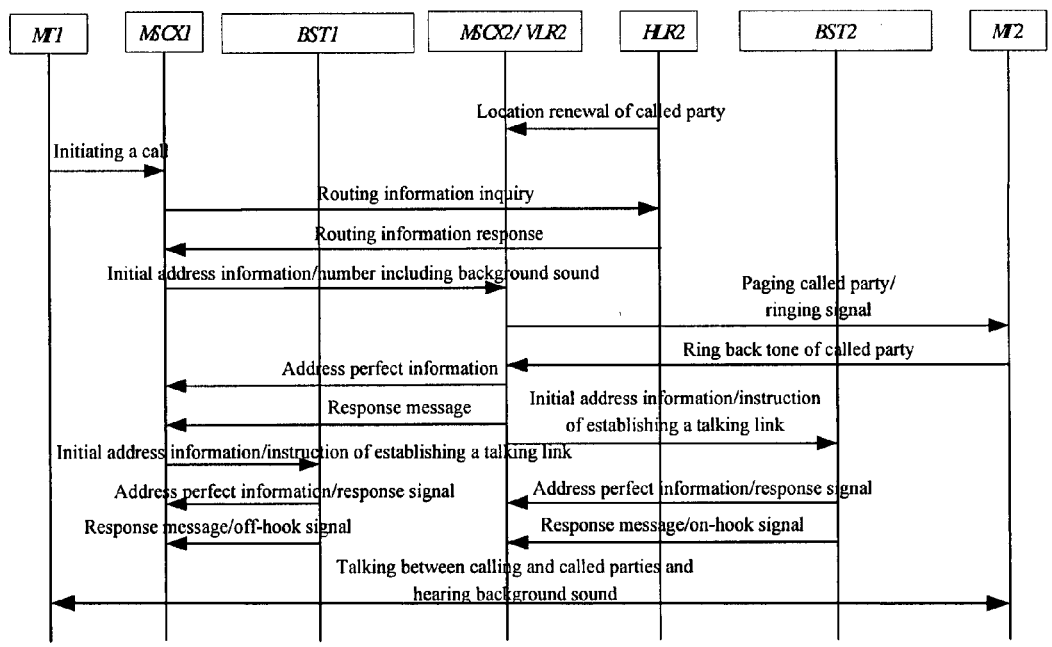
FIG. 3 is processing flowchart of the calling party and/or the called party of the present invention at roaming state.

Referring to FIG. 3, when the calling mobile communication terminal MT1 is at roaming state, the mobile switching center MSC1 of the calling party, making a call to the calling mobile communication terminal MT1 according to the communication and switching standards of mobile communication networks, is actually the switching center MSCX1 of the roamed location of the calling party. At this time, if the calling mobile communication terminal MT1 makes a call to the called mobile communication terminal MT2, the switching center MSCX1 of the roamed location of the calling party, instead of the mobile switching center MSC1 of the calling party, establishes a talking link with the called mobile communication terminal MT2 and the background sound service system BST1. At this time, if the calling mobile communication terminal MT1 is a contracted subscriber of the background sound service, the information on the contracting sign of the calling mobile communication terminal MT1 is stored in the visitor location register VLR1 of the roamed location of the calling mobile communication terminal MT1.

In other words, when the switching center MSCX1 of the roamed location of the calling party is establishing a three-party talking between the calling mobile communication terminal MT1, the called mobile communication terminal MT2 and the background sound service system BST1, if the number dialed by the calling mobile communication terminal MT1 contains the number of background sound service, the switching center MSCX1 of the roamed location of the calling party directly gives instructions to establish a talking link to the background sound service system BST1. The instruction is actually a call signaling sent to the switching equipment in the background sound service system. When the background sound service system BST1 receives the call signaling sent by the switching center MSCX1 of the roamed location of the calling party, as long as there is disengaged channel in the switching equipment, the switching equipment will make response to the call signaling, and send off-hook signal to the switching center MSCX1 of the roamed location of the calling party after the response is made. Upon receiving the response signal and the off-hook signal, the switching center MSCX1 of the roamed location of the calling party adds the background sound service channel provided by the background sound service system BST1 to the talking link between the calling mobile communication terminal MT1 and the called mobile communication terminal MT2, to establish a three-party talking.

If the number dialed by the calling mobile communication terminal MT1 does not contain the number of background sound service, the switching center MSCX1 of the roamed location of the calling party makes access to the visitor location register VLR1 of the roamed location of the calling mobile communication terminal MT1 to acquire the information on the contracting state of the calling mobile communication terminal MT1.

Similar to the calling mobile communication terminal MT1, when the called mobile communication terminal MT2 is at roaming state, the mobile switching center MSC2 of the calling party, making a call to the called mobile communication terminal MT2 according to the communication and switching standards of mobile communication networks, is actually the switching center MSCX2 of the roamed location of the called party. At this time, if the calling mobile communication terminal MT1 makes a call to the called mobile communication terminal MT2, the switching center MSCX2 of the roamed location of the called party, instead of the mobile switching center MSC2 of the called party, establishes a talking link with the calling mobile communication terminal MT2. At this time, the information on the contracting sign of the called mobile communication terminal MT2 is stored in the visitor location register VLR2 of the roamed location of the called mobile communication terminal MT2. In other words, when the switching center MSCX2 of the roamed location of the called party establishes a three-party talking between the calling mobile communication terminal MT1, the called mobile communication terminal MT2 and the background sound service system BST2, the switching center MSCX2 of the roamed location of the called party needs to first make access to the visitor location register VLR2 of the roamed location of the called mobile communication terminal MT2 to acquire the information on the contracting state of the called mobile communication terminal MT2.

It should be noted that the embodiments above are only for the illustration of the present invention and not intended to limit the present invention. Therefore, though the present invention has been describe in detail with reference to the embodiments above, it should be understood by those skilled in the art, that any modification or equivalent replacement may be made to the present invention without departing from the spirit and scope of the present invention that are set forth in the appended claims.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for adding background sound to mobile communication talking, comprising the steps of:
   receiving, by a network side, a call made by a calling mobile communication terminal; and
   sending, by the network side, a ring back tone signal to the calling mobile communication terminal according to a talking state of a called mobile communication terminal, establishing a talking link between the calling mobile communication terminal and the called mobile communication terminal after the off-hook signal of the called mobile communication terminal is received, and playing background sound in the talking according to the button signal sent by the calling mobile communication terminal and/or the called mobile communication terminal;
   wherein the network side comprises a background sound service system and a mobile switching center, and the step of establishing the talking link between the calling mobile communication terminal and the called mobile communication terminal comprises:
   establishing, by the mobile switching center, a talking link between the calling mobile communication terminal and the called mobile communication terminal and sending instructions to establish a talking link to the background sound service system;
   providing, by the background sound service system, a background sound service channel to the mobile switching center; and
   adding, by the mobile switching center, the background sound service channel provided by the background sound service system to the talking link between the calling mobile communication terminal and the called mobile communication terminal to establish a three-party talking link.

2. A method of claim 1, wherein the step of playing background sound in the talking further comprises the step of:
   playing, by the background sound service system, the background sound to the calling mobile communication terminal and/or the called mobile communication terminal.

3. A method of claim 2, wherein the step of playing background sound to the calling mobile communication terminal and the called mobile communication terminal by the background sound service system further comprises the steps of:
   seeking out, by the background sound service system according to the information on the number of the calling mobile communication terminal, the contracting information on the calling mobile communication terminal and acquiring the playing parameters and playing contents, and sending them to the calling mobile communication terminal and the called mobile communication terminal through the mobile switching center; or
   seeking out, by the background sound service system according to the information on the number of the called mobile communication terminal, the contracting information on the called mobile communication terminal and acquiring the playing parameters and playing contents, and sending them to the calling mobile communication terminal and the called mobile communication terminal through the mobile switching center.

4. A method of claim 1, wherein the mobile switching center is the mobile switching center of the calling party or the mobile switching center of the called party.

5. A method of claim 1, wherein playing background sound in the talking according to the button signal comprises one of the following or the combination thereof:
   selecting the background sound to be played, adjusting the speed of playing of the background sound, adjusting the volume of playing of the background sound, adjusting the effect of playing of the background sound, starting playing of the background sound or stopping playing of the background sound.

6. A method of claim 1, further comprising: the network side plays the background sound in the talking according to the information on the contracting of the background sound service of the calling mobile communication terminal and/or the called mobile communication terminal.

7. A mobile communication system for adding background sound to the mobile communication telephone talking, wherein the network side includes a background sound service system for the provision of background sound service and a mobile switching center,
   after receiving the call made by a calling mobile communication terminal, the network side sends a ring back signal to the calling mobile communication terminal according to the information on the state of talking of the called mobile communication terminal and establishes a talking link between the calling mobile communication terminal and the called mobile communication terminal after receiving an off-hook signal of the called mobile communication terminal, and the background sound service system plays the background sound in the talking link according to the button signal sent by the calling mobile communication terminal and/or the called mobile communication terminal;

wherein the network side establishes the talking link between the calling mobile communication terminal and the called mobile communication terminal comprises:

the mobile switching center establishes a talking link between the calling mobile communication terminal and the called mobile communication terminal and sends instructions to establish a talking link to the background sound service system;

the background sound service system provides a background sound service channel to the mobile switching center; and the mobile switching center adds the background sound service channel provided by the background sound service system to the talking link between the calling mobile communication terminal and the called mobile communication terminal to establish a three-party talking link.

8. A system of claim 7, wherein the background sound service system further comprises:

a switching device, provided with a port of mobile communication network, for connecting to the mobile communication network and establishing a talking link between the background sound service system and the mobile switching center;

a background sound storing device for storing background sound data;

a background sound playing device for, during the talking between the calling mobile communication terminal and the called mobile communication terminal, reading out the data of the background sound to be played from the background sound storing device and playing the background sound to the calling mobile communication terminal and/or the called mobile communication terminal;

a control device, connected to the background sound playing device for controlling the start/stop operation of the background sound playing device.

9. A system of claim 8, wherein the background sound playing device analyzes the control demand sent by the control device and performs one of the following or the combination thereof:

selecting the background sound to be played from the background sound storing device, adjusting the playing speed, adjusting the volume of the background sound, adjusting the playing effect of the background sound, starting playing the background sound, or stopping the playing of the background sound.

10. A system of claim 8, wherein the background sound service system further comprises a background sound data management device used for:

controlling a background sound provider to store the background sound data in the background sound storing device;

controlling a background sound subscriber to order, modify, adjust or cancel the background sound service; and controlling a background sound service operator to manage the background sound data.

* * * * *